Aug. 6, 1957 W. DOLL, JR 2,801,790
COMPRESSOR BLADING
Filed June 21, 1950
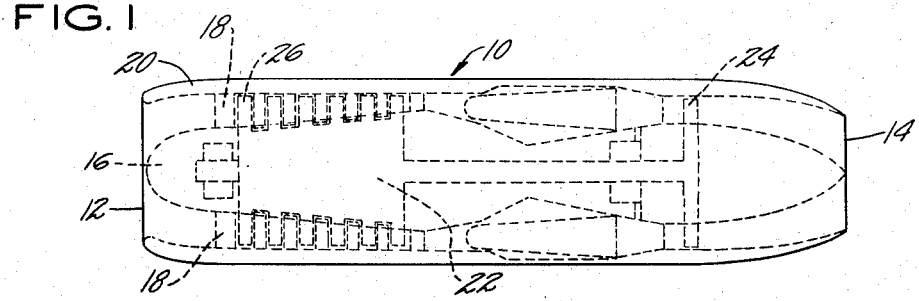
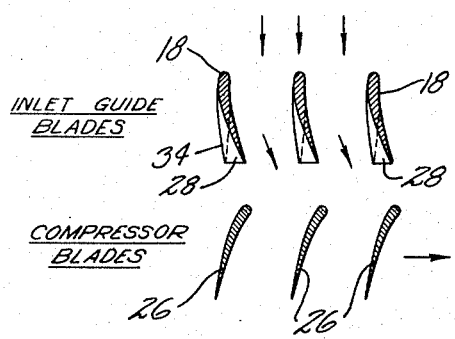
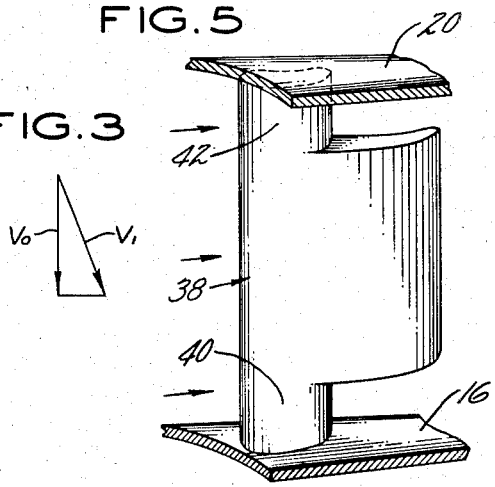
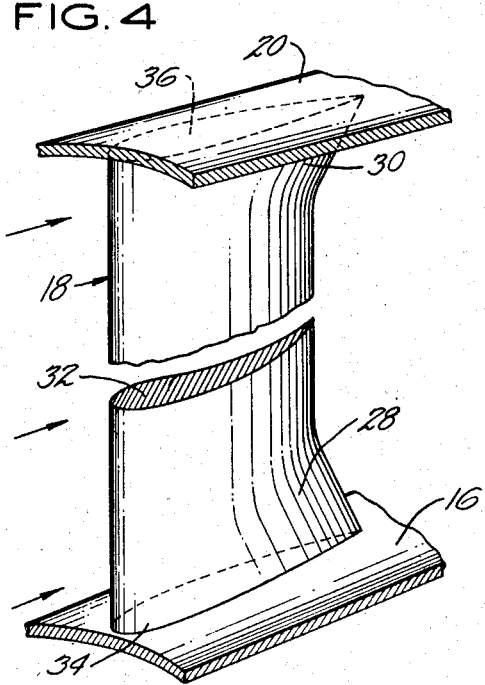
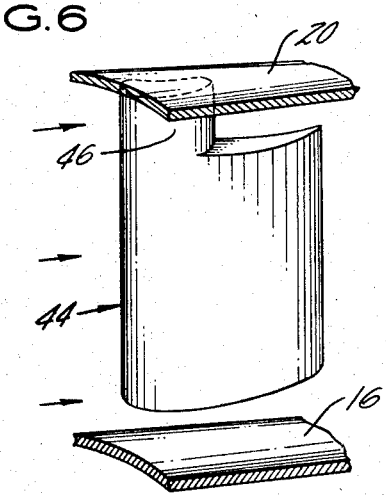
INVENTOR
WALTER DOLL, JR.
BY *Charles A. Warren*
ATTORNEY

United States Patent Office 2,801,790
Patented Aug. 6, 1957

2,801,790

COMPRESSOR BLADING

Walter Doll, Jr., Manchester, Conn., assignor to United Aircraft Corporation, East Hartford, Conn., a corporation of Delaware Application June 21, 1950, Serial No. 169,461

14 Claims. (Cl. 230—132)

This invention relates to a configuration of compressor blading; more specifically to inlet guide blades.

In flow machinery designed to convert kinetic energy into pressure rise, deviations from ideal design conditions always exist because of friction along the walls of the flow passage. Efficiency is lowered and changes in flow distribution result which may adversely affect subsequent bladed elements. In aircraft gas turbine power plants, where maximum compression per stage, high efficiency and wide operating range are necessary, design and operating limitations imposed by wall friction and boundary layer are very serious.

It has been found that the effect of wall friction and boundary layer can be reduced or minimized by modifying blading locally near the walls. Tests on a number of individual axial flow compressor stages, as well as multistage compressor assemblies, using blades modified according to the principles of this invention resulted in substantial performance improvement over corresponding conventionally designed parts. Detailed probing tests also indicated improved velocity distribution and performance in stages subsequent to the one in which the modifications were made. A preliminary test on a centrifugal flow compressor with similarly modified blades indicated that this principle can also be used with such compressors with success.

A feature of this invention is the alteration or modification of compressor blading to minimize the detrimental effect of wall friction and boundary layer, and thus improve the overall performance of the compressor.

A feature of this invention is a compressor blade configuration which improves the distribution of gas velocities within the compressor.

Another feature of this invention is a compressor blade configuration which increases the pressure rise across the compressor.

Other features and advantages will be apparent from the specification and claims and from the accompanying drawing which illustrates embodiments of the invention.

In the drawing:

Fig. 1 shows an axial flow gas turbine power plant having inlet guide blades incorporating this invention.

Fig. 2 is a section through the inlet guide blades and the first row of the compressor blades of the gas turbine power plant shown in Figure 1.

Fig. 3 is a vector diagram of the air entering and leaving the inlet guide blades.

Fig. 4 is a fragmentary section of the power plant showing the inlet guide blade.

Figs. 5 and 6 show simplified forms of modified inlet guide blades.

An axial flow gas turbine power plant is indicated in Fig. 1 at 10, the power plant having an inlet 12 and an outlet 14 for the flow of gases therethrough. Inlet cone 16 defines the inner wall for the gases entering the power plant and carries a number of radially mounted inlet guide blades 18 which are supported at their outer tips by casing 20 defining an outer wall. An axial flow compressor rotor 22 is driven by turbine wheel 24, the blades on the first stage of the compressor being indicated at 26.

Gases entering the power plant have an axial velocity $V_0$ as indicated in Fig. 3. These gases pass over inlet guide blades 18 which turn the gases from the axial direction through some prescribed pattern of turning, as can be seen in Fig. 2, leaving the blades in the direction indicated by the vector $V_1$. The turning pattern, as with inlet guide blades now in use, is designed to extend in a smooth and regular manner from wall to wall. Actually, a fluid boundary layer exists adjacent to the inner and outer casings 16 and 20, respectively, which by virtue of its reduced kinetic energy is not imparted as great a pressure rise in the compressor blading as experienced by the major portion of the gas flow. As a result the inlet conditions at subsequent stages of the compressor will be adversely affected, and, in severe cases, separation of the flow from the walls will ensue.

It has been discovered that by reducing or eliminating the turning of the gases by the inlet guide blades near one or both of the casing walls, or even to turn it slightly in a direction opposite to that normally established by the blades relative to the axis of the power plant as determined by design requirements, the kinetic energy of the gases in the boundary layer is increased to a level which reduces the tendency for wall separation in subsequent blading. Thus, instead of the gases adjacent to the casing walls leaving the inlet guide blades in the direction $V_1$, they maintain a substantially axial direction approximating that of $V_0$. The extent of the modification to the blades depends upon the initial tendencies of the subsequent compressor stages to stall.

The principle involved consists of increasing the axial component of fluid momentum near the walls, which in turn permits the boundary layer fluid to flow against higher pressure gradients as produced by the mid-passage portion of the blading. The main effect of changing the guide blade angle near the wall appears to be an increase in loading of the corresponding section of the subsequent rotating blades which increases the axial component of force imparted to the fluid by the blades, thus increasing the kinetic energy of the fluid near the walls.

One of the inlet guide blades 18 is shown in detail in Fig. 4. The span of this blade, except for modified portions 28 and 30 adjacent to the walls of casings 16 and 20, respectively, has a cambered airfoil cross-section as shown at 32. The blade tips have a substantially symmetrical cross-section as shown at 34 and 36, and the rearward part of the blade in the modified portions 28 and 30 is blended to form a smooth and continuous surface with the remainder of the span.

Thus, gases passing over the midportion of the blade span are turned and leave the trailing edge of the blade in the direction of $V_1$. Gases passing over the modified portions 28 and 30 leave the trailing edge with a more nearly axial direction of flow; while gases passing over the blade adjacent to walls 16 and 20 have substantially an axial direction of flow. The exact character of the blade modification necessary to maintain the kinetic energy of the gases in the boundary layer at a high level is, as stated before, dictated by design requirements.

Other forms of modified inlet guide blades are shown in Figs. 5 and 6. In Fig. 5, the blade 38 is similar to inlet guide blade 18 except that the modified portions 28 and 30 of blade 18 have been completely removed, leaving only struts 40 and 42 supporting blade 38, between casings 16 and 20. Here gases passing over the midportion of the blade span are turned and leave the trailing edge of the blade in the direction $V_1$, while gases passing over struts 40 and 42 are turned slightly, if at all, maintaining substantially an axial direction of flow. The amount which the trailing edge span is reduced, and the extent which the chord of the blade is modified, is determined by design requirements of the particular installation.

In Fig. 6, a blade 44 is shown which is cantilevered from casing 20, the blade being cut back adjacent to the casing and supported solely by axial strut 46. That portion of the inlet guide blade which is adjacent to casing 16, and which ordinarily would be modified, is entirely omitted in this installation and gases flowing adjacent to wall 16 maintain an axial direction of flow.

The inlet guide blades shown in Figs. 5 and 6 have been modified in a rather crude fashion but are so illustrated to aid in understanding the invention. In actual practice, the cut-back portions would be blended with the unmodified portions, or would be so formed as to prevent the occurrence of undesirable aerodynamic effects. The exact nature and extent of the blade modification is of course determined by the character of the particular installation in which the blade is being employed.

It is to be understood that the invention is not limited to the specific improvements herein illustrated and described but may be used in other ways without departure from their spirit as defined by the following claims.

I claim:

1. A compressor blade of the class described having an operative span for the flow of gases thereover, said span having a cross-section shape designed to turn the gases passing thereover through a predetermined pattern of turning, the mid-portion of said span being shaped to turn the gases passing over said portion from their original direction, and the outer-portions of said span being shaped to substantially maintain the original direction of the gases passing over said portions.

2. A compressor blade of the class described having an operative span for the flow of gases thereover, said span being of airfoil cross-section and designed to turn the gases passing thereover through a predetermined pattern of turning, the mid-portion of said span being cambered to turn the gases passing over said portion from their original direction, and the outer-portions of said span being uncambered to substantially maintain the original direction of the gases passing over said portions.

3. A compressor blade of the class described having an operative span for the flow of gases thereover, said span having a leading edge and a trailing edge and a cross-section shape designed to turn the gases passing thereover through a predetermined pattern of turning, the mid-portion of said span being shaped to turn the gases passing over said portion from their original direction, and the outer portions of said span being shaped to substantially maintain the original direction of the gases passing over said portions, said trailing edge being an irregular line due to the diifferences in cross-section shape across said span.

4. A compressor blade of the class described having an operative span for the flow of gases thereover, said span having a leading edge and a trailing edge and of airfoil cross-section and designed to turn the gases passing thereover through a predetermined pattern of turning, the mid-portion of said span being cambered to turn the gases passing over said portion from their original direction, the outer portions of said span being uncambered to substantially maintain the original direction of the gases passing over said portions, said trailing edge being an irregular line due to the differences in camber across said span, and said cambered and uncambered portions being blended to form a smooth continuous span surface.

5. A compressor blade of the class described having an operative span for the flow of gases thereover, said span being of airfoil cross-section and designed to turn the gases passing thereover through a predetermined pattern of turning, the mid-portion of said span being cambered so that gases passing over said portion will leave at a predetermined angle with respect to their original direction, and the outer portions of said span being uncambered so that the gases passing over said portions leave at an angle substantially parallel to their original direction.

6. A compressor blade of the class described having an operative span for the flow of gases thereover, said span being of airfoil cross-section and designed to turn the gases passing thereover through a predetermined pattern of turning, at least one end portion of said span being uncambered so that the gases passing over said portion maintain substantially their original direction, the remainder of said span being cambered to turn the gases passing thereover from their original direction.

7. In combination with walls defining a passage for the flow of gases therethrough and in which a boundary layer region exists adjacent said walls, at least one blade extending across said passage and adapted to impart a predetermined direction of flow to said gases, the portions of said blade within said boundary layer regions having a cross-section shape to maintain substantially the original direction of the gases passing thereover, and the portion of said blade without said boundary layer regions having a cross-section shape to change the direction of the gases passing thereover.

8. In combination with walls defining a passage for the flow of gases therethrough and in which a boundary layer region exists adjacent said walls, a plurality of blades of airfoil cross-section extending across said passage and adapted to impart a predetermined direction of flow to said gases, the portions of said blades within said boundary layer regions being uncambered to maintain substantially the original direction of the gases passing thereover, and the portion of each of said blades without said boundary layer regions being cambered to change the direction of the gases passing thereover.

9. In combination with concentric walls defining an annular passage for the flow of gases therethrough in an axial direction and in which a boundary layer region exists adjacent said walls, a plurality of blades of airfoil cross-section extending substantially radially across said passage and adapted to impart a predetermined direction of flow to said gases, the portions of said blades within said boundary layer regions being uncambered to maintain substantially an axial direction of flow of the gases passing thereover, and the portion of each of said blades without said boundary layer regions being cambered to change the direction of the gases passing thereover from the axial direction.

10. In combination with walls defining a passage for the flow of gases therethrough and in which a boundary layer region exists adjacent said walls, a plurality of blades, each having a leading edge and a trailing edge and of airfoil cross-section, extending across said passage and adapted to impart a predetermined direction of flow to said gases, the portions of said blades within said boundary layer regions being uncambered to maintain substantially the original direction of the gases passing thereover, and the portion of each of said blades without said boundary layer regions being cambered to change the direction of the gases passing thereover, the trailing edge of the blades being an irregular line due to the differences in camber across said span.

11. In combination with concentric walls defining an annular passage for the flow of gases therethrough in an axial direction and in which a boundary layer region exists adjacent said walls, a plurality of blades of airfoil cross-section extending across said passage and adapted to impart a predetermined direction of flow to said gases, said blades being modified locally adjacent at least one of said walls in said boundary layer region, said modified portion being uncambered to maintain substantially the axial direction of the gases passing over said portion, and the remainder of each of said blades being cambered to change the direction of the gases passing thereover.

12. In combination with concentric walls defining an annular passage for the flow of gases therethrough and in which a boundary layer region exists adjacent said walls, a plurality of blades of airfoil cross-section extending across said passage and adapted to impart a predetermined direction of flow to said gases, the portions of said blades within said boundary layer regions having a reduced chord with respect to the remainder of the blade and a cross-section shape to maintain substantially the original direction of the gases passing thereover, the remainder of each of said blades being cambered to change the direction of the gases passing thereover, the trailing edge of the blades being an irregular line due to the differences in chord across said blade.

13. In combination with concentric walls defining an annular passage for the flow of gases therethrough in an axial direction and in which a boundary layer region exists adjacent said walls, a plurality of blades, each having a leading edge and a trailing edge and of airfoil cross-section, extending substantially radially across said passage and adapted to impart a predetermined direction of flow to said gases, said blades being modified locally within said boundary layer regions, said modified portions being uncambered to maintain substantially the axial direction of the gases passing over said portions, the remainder of each of said blades being cambered to change the direction of the gases passing thereover, said leading edge of each blade being a regular line and said trailing edge of each blade being an irregular line due to differences in camber across said span.

14. In combination with walls defining a passage for the flow of gases therethrough and in which a boundary layer region exists adjacent said walls, a plurality of blades of airfoil cross-section extending from at least one wall substantially across said passage and adapted to impart a predetermined direction of flow to said gases, said blades being modified locally in said boundary layer region and adjacent the wall from which they extend, said modified portion being uncambered to maintain substantially the original direction of the gases passing over said portion, and the remainder of each of said blades being cambered to change the direction of the gases passing thereover.

References Cited in the file of this patent

UNITED STATES PATENTS

| | | |
|---|---|---|
| 1,317,707 | Johnson | Oct. 7, 1919 |
| 1,398,461 | Kerr | Nov. 29, 1921 |
| 1,771,023 | Allen | July 22, 1930 |
| 2,355,413 | Bloomberg | Aug. 8, 1944 |
| 2,415,847 | Redding | Feb. 18, 1947 |
| 2,435,236 | Redding | Feb. 3, 1948 |
| 2,446,552 | Redding | Aug. 10, 1948 |
| 2,450,745 | Baumann | Oct. 5, 1948 |
| 2,460,778 | Willgoos | Feb. 1, 1949 |
| 2,473,329 | Candler | June 14, 1949 |